UNITED STATES PATENT OFFICE.

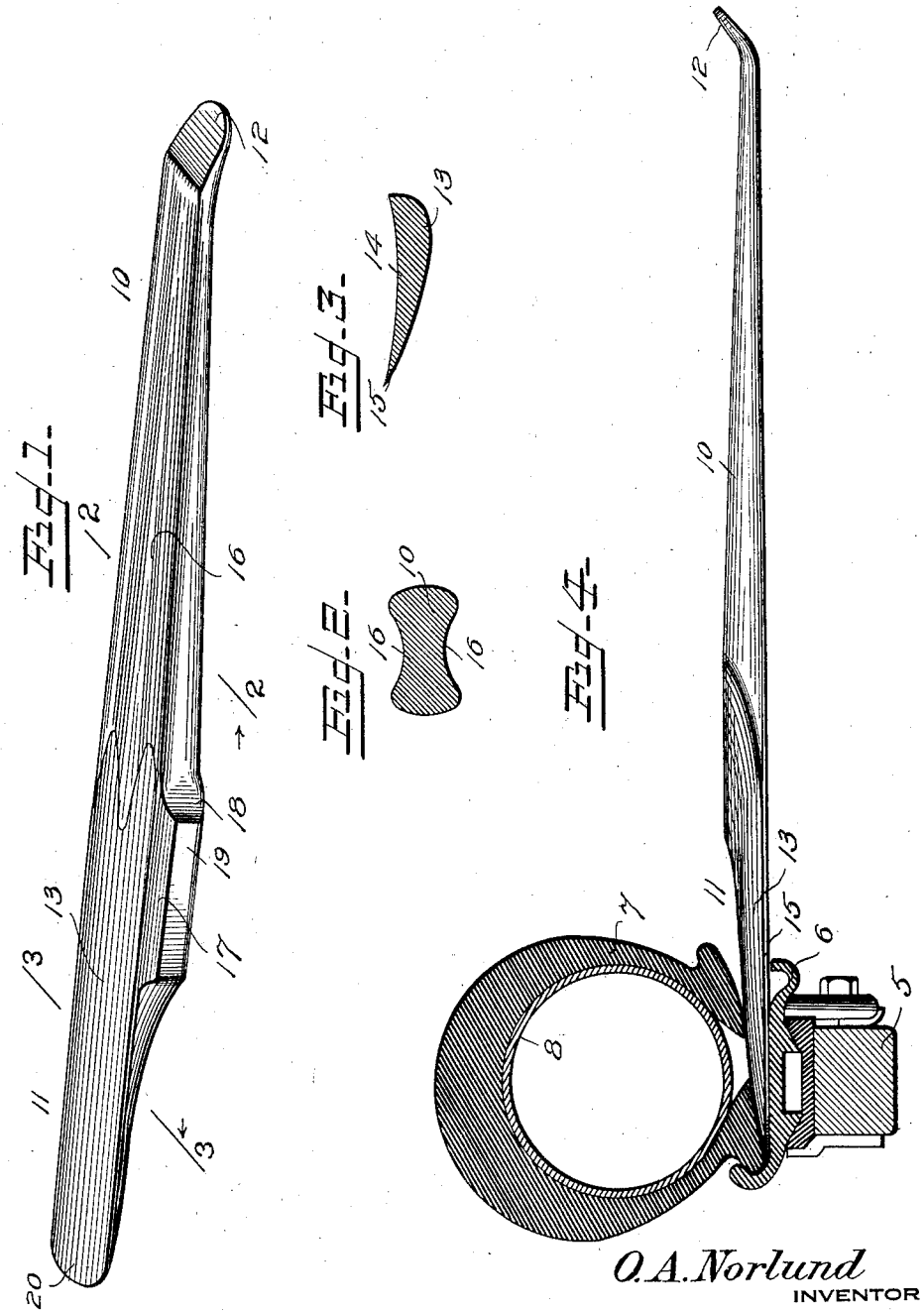

OLOF AUGUST NORLUND, OF WILLIAMSPORT, PENNSYLVANIA.

TIRE-REMOVING TOOL.

1,385,948.  Specification of Letters Patent. Patented July 26, 1921.

Application filed March 24, 1920. Serial No. 368,257.

*To all whom it may concern:*

Be it known that I, OLOF A. NORLUND, a citizen of the United States, residing at Williamsport, in the county of Lycoming and State of Pennsylvania, have invented a new and useful Tire-Removing Tool, of which the following is a specification.

This invention relates to tools designed especially for removing tires from the rims of automobile wheels.

The object of the invention is to provide a tool of general utility: for example, one which is not merely useful in removing or mounting tire casings but is capable of cutting loose casings rusted fast to rims and which will also serve as a pry bar for releasing the lock rings from the rim and casing, besides being usable as a lever for spreading the springs of the car working around the motor, brakes, etc.

The special object of the invention is to provide a tool which will cut a rusted tire loose from the rim without injury to the casing, the flap or the inner tube, and which does it easily and quickly.

Any tire that has been on a car for a long time where demountable rims are used is liable to become rusted so fast to the rim, in both the casing and the protecting flap, that ordinary tools are altogether inadequate. Frequently a sledge hammer is powerless to remove a tire in such a condition. On some occasions it is necessary to saw the tire through with a hack saw to get the tire off. In most instances, when using such tools as sledge hammers, the rim as well as the tire is injured to a point where it becomes worthless. If one attempts to pry off these rusted casings the inner tube is usually torn to pieces.

With the present tool, it is easy to remove the lock ring and then to drive one end of the tool underneath the casing and flap, whereupon a certain portion of the tool is hammered to drive the tool around the rim underneath the casing and flap. This result is reached by reason of the hollow ground cutting edge provided in the present instrument, which cutting edge cuts loose the casing and flap without any possible injury to either or without endangering the inner tube. Once loosened, the tire is readily removed in the usual manner. One end of the tool is so shaped as to enter the slots of the lock ring so that the same may be pried loose. Thus it is seen that this tool will perform all the usual operations of a tire removing tool and will do what other tools will not, namely, remove tires rusted fast to rims without injury to any of the parts of the tire.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Figure 1 is a perspective view of the preferred embodiment of the invention looking from the side which is to be hammered.

Fig. 2 is a cross section on the line 2—2 of Fig. 1.

Fig. 3 is a cross section on the line 3—3 of Fig. 1.

Fig. 4 is a view showing the tool in operation with the rim and tire in cross section, the tool being viewed from the cutting edge.

The improved implement is preferably made of high grade steel to insure strength and durability. It comprises a straight shank or lever including a handle portion 10 and a blade portion 11. The handle portion may be grooved, as indicated at 16, to reduce the weight of the tool and to make the same more easily handled. The outer end of the handle portion is bent, as at 12, such bent portion being flattened on both faces. As Fig. 1 indicates, the handle tapers in both width and thickness from the center of the tool toward this outer and bent end.

The blade portion 11 includes two faces, a rounded face 13 and a hollow ground face 14; thus the cross section of the blade portion is convex on one face and concave on the other. A cutting or knife edge 15 is provided where the two faces meet, such cutting edge being on one side only of the tool.

That side of the tool opposite to the cutting edge carries a projection 17 which is adapted to receive the blows of a hammer or the like. The projection 17 is integral with the shank and is located at the thickest portion of the same. The projection 17 includes a face 18 transverse to the body of the tool and a face 19 running longitudinally with the tool. The face 18 is provided so that a hammer may drive the tool in between a rim and a tire. The face 19 is provided so that when the tool is once driven into the position illustrated in Fig. 4, it may be forced along the periphery of the rim by hammer blows, thus cutting loose the rusted tire. The end of the tool opposite to the end 12 designated by the numeral 20 in the drawing has less thickness than any other portion of the tool except the knife edge. The thickness of the blade portion increases from the end 20 toward that portion which carries the projection 17. This increase in thickness is seen in Fig. 4; thus when the tool is driven underneath a casing a wedging action is exerted, and due to the knife edge and the hollow ground face, this wedging action also takes place when the tool is run around the periphery of the rim.

It has been found that an implement designed like the present one but without the hollow ground face and knife edge is useless to remove a tire rusted fast to a rim. The grinding of the blade portion is such that it fits nicely upon the periphery of the rim and lifts the rusted casing off the rim without damaging it in the slightest. The projection 17 provides a convenient place for a hammer to strike, and being located at the thickest part of the tool, will bear heavy blows, if necessary, without danger of breakage. The bent end 12 is designed to be inserted between the tire and the lock ring (not shown) of the rim 6 to effect removal of the ring, thus preparing a way for the introduction of the knife end between the tire and the rim. It will be clear that all parts of the implement are employed in the unitary operation of removing tires from rims, the primary purpose for which this tool was designed.

While the present tool has been described as a tire removing tool, it is almost equally useful in putting tires on rims and may be used for many other purposes, as outlined above. I therefore do not wish to be limited to any particular use of the tool and only desire to be limited by the following claims.

What is claimed is:—

1. In a tire removing tool, a shank, said shank comprising a knife portion, a handle portion, and a portion designed to receive blows, the knife portion having a rounded face on one side of the tool and a hollow ground face on the opposite side, and a knife edge provided along one side of the tool where the two faces meet, the end of the knife portion being formed with a knife edge which forms a continuation of the other knife edge.

2. A tire removing tool comprising a shank including a knife portion having a knife edge along one side and at the end of the tool, a handle portion, and a portion designed to receive blows, the latter named portion being located between the knife portion and the handle portion and at the edge opposite the knife edge, the tool having its greatest thickness where the blow-receiving portion is provided and tapering in thickness to each of its ends, that end where the knife portion is provided forming a continuation of the said knife edge, the handle portion also tapering in width.

3. A tire removing tool comprising a shank including a knife portion, a handle portion, and a portion adapted to receive blows, said knife portion having a rounded or convex face and a hollow ground or concave face and a knife edge provided along one side of the tool where the two faces meet, and the end of the knife portion being made thin, the blow-receiving portion having two faces adapted to be struck, one of said faces running transversely of the tool, the other extending longitudinally of the tool on that edge of the tool opposite from the knife edge, the longitudinal face being the longer.

In testimony that I claim the foregoing as my own, I have hereto affixed my signature.

OLOF AUGUST NORLUND.